United States Patent
Kozek et al.

(10) Patent No.: US 8,300,519 B2
(45) Date of Patent: Oct. 30, 2012

(54) METHOD AND DEVICE FOR CROSSTALK EVALUATION AND COMMUNICATION SYSTEM COMPRISING SUCH DEVICE

(75) Inventors: Werner Kozek, Vienna (AT); Josef Mück, München (DE)

(73) Assignee: Nokia Siemens Networks Oy, Espoo (FI)

( * ) Notice: Subject to any disclaimer, the term of this patent is extended or adjusted under 35 U.S.C. 154(b) by 236 days.

(21) Appl. No.: 12/602,253

(22) PCT Filed: May 15, 2008

(86) PCT No.: PCT/EP2008/055969
§ 371 (c)(1),
(2), (4) Date: Feb. 1, 2010

(87) PCT Pub. No.: WO2008/145535
PCT Pub. Date: Dec. 4, 2008

(65) Prior Publication Data
US 2010/0135374 A1    Jun. 3, 2010

(30) Foreign Application Priority Data

May 29, 2007  (EP) ..................... 07010645

(51) Int. Cl.
*H04J 1/12* (2006.01)
*H04J 3/10* (2006.01)
(52) U.S. Cl. ........ 370/201; 375/224; 375/346; 379/416; 702/69
(58) Field of Classification Search .................. 370/201; 375/224, 346; 379/416, 417; 702/69
See application file for complete search history.

(56) References Cited

U.S. PATENT DOCUMENTS

| | | | |
|---|---|---|---|
| 6,538,451 B1 | 3/2003 | Galli et al. | |
| 6,982,560 B2* | 1/2006 | Pandya et al. | 324/628 |
| 6,985,521 B1 | 1/2006 | Rezvani et al. | |
| 2003/0190000 A1* | 10/2003 | Matsumoto | 375/350 |
| 2005/0195892 A1 | 9/2005 | Ginis et al. | |
| 2007/0083339 A1* | 4/2007 | Sawyer et al. | 702/69 |
| 2007/0108989 A1* | 5/2007 | Shi | 324/533 |
| 2007/0121715 A1* | 5/2007 | Shi | 375/224 |
| 2007/0133723 A1* | 6/2007 | Cheong et al. | 375/346 |
| 2008/0031313 A1* | 2/2008 | Oksman | 375/222 |
| 2008/0285635 A1* | 11/2008 | Wang et al. | 375/224 |

OTHER PUBLICATIONS

ITU-T: "Very High Speed Digital Subscriber Line Transceivers", Series G: Transmission Systems and Media, Digital Systems and Networks, G.993.1, Jun. 2004.
ITU-T: "Very High Speed Digital Subscriber Line Transceivers 2 (VDSL2)", Serie G: Transmission Systems and Media, Digital Systems and Networks, G. 993.2, Feb. 2006.
ITU—Telecommunication Standardization Sector, "Updated Issues List for G.It",Temporary Document NC-U09R1, Study Group 15, Apr. 16-20, 2007, Napa Valley, California.

* cited by examiner

*Primary Examiner* — Luat Phung
(74) *Attorney, Agent, or Firm* — Laurence A. Greenberg; Werner H. Stemer; Ralph E. Locher

(57) ABSTRACT

A method and a device are provided for crosstalk evaluation of a channel, wherein the channel is represented and/or modeled by a multiple-input-multiple-output (MIMO) system connecting a first network component with at least one second network component. The MIMO system contains first coefficients associated with transmission lines that are in particular associated with crosstalk. The crosstalk contains a near-end crosstalk (NEXT) portion and a far-end crosstalk (FEXT) portion. The first network component sends a signal to one second network component; the far-end crosstalk portion and the near end crosstalk portion are evaluated.

21 Claims, 2 Drawing Sheets

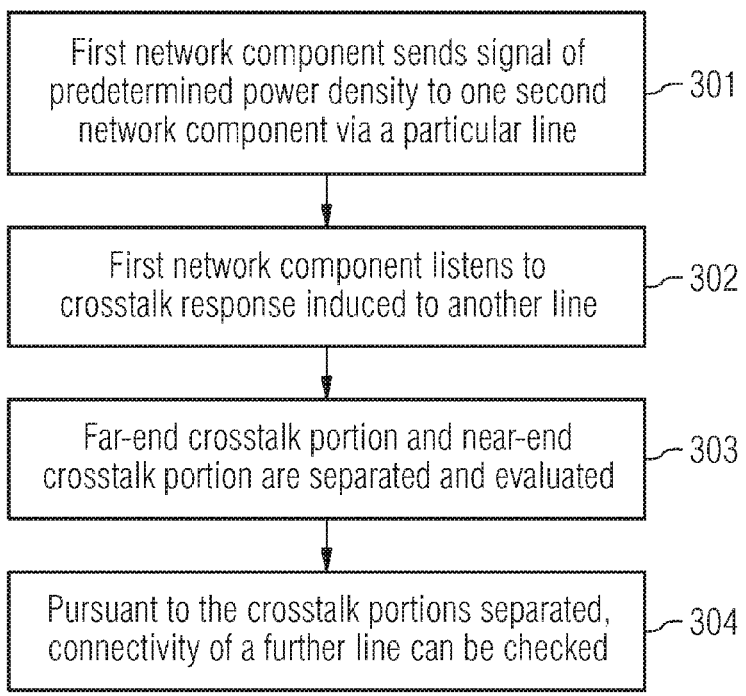
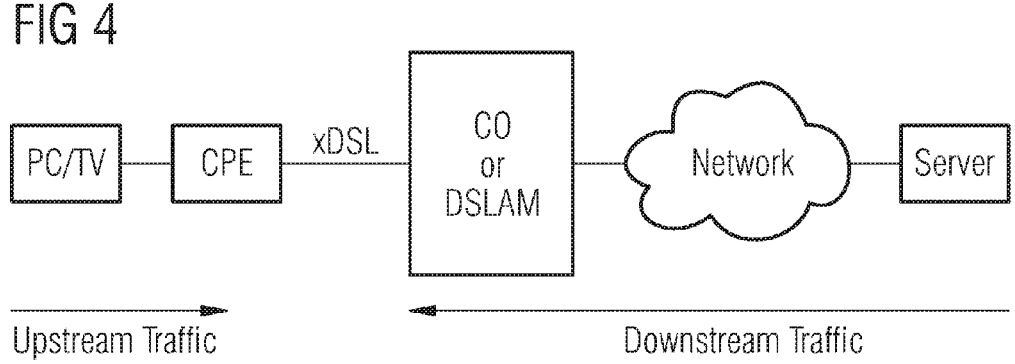

METHOD AND DEVICE FOR CROSSTALK EVALUATION AND COMMUNICATION SYSTEM COMPRISING SUCH DEVICE

BACKGROUND OF THE INVENTION

Field of the Invention

The invention relates to a method and to a device for crosstalk evaluation and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream-12 Mbit/s in upstream with asymmetric access.

Currently, standard VDSL uses up to 4 different frequency bands, two for upstream (from the client to the telecom provider) and two for downstream. Suitable modulation techniques are QAM (quadrature amplitude modulation) or DMT (discrete multitone modulation).

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

A multiple-input-multiple-output system (hereinafter referred to as MIMO system) is of significant importance in modern communication technology. Such MIMO system allows to model crosstalk interference of a telecommunication system.

Methods for single ended line testing (SELT) are used in DSL environments to ensure operation of such system. Such SELT-method is, e.g., able to recognize a line failure (interruption of a path or loop) within a main distribution unit without additional measurement equipment required.

BRIEF SUMMARY OF THE INVENTION

The object to be solved is to transfer the principles of single ended line testing to the MIMO system.

This problem is solved according to the features of the independent claims. Further embodiments result from the depending claims.

In order to overcome this problem a method is provided for crosstalk evaluation of a channel, wherein the channel is represented and/or modeled by a multiple-input-multiple-output (MIMO) system connecting a first network component with at least one second network component. The MIMO system comprises first coefficients associated with transmission lines that are in particular associated with crosstalk, wherein said crosstalk comprises a near-end crosstalk (NEXT) portion and a far-end crosstalk (FEXT) portion. The method comprises the steps:

- the first network component sends a signal to one second network component;
- the far-end crosstalk portion and the near end crosstalk portion are evaluated.

It is an embodiment that the signal sent by the first network component is a signal of a predetermined power density, in particular a maximum power density regarding the particular line or connection.

Hence, the approach allows to perform a single ended line testing by utilizing crosstalk, thereby determining whether a particular line between the first network component and one of the second network components is broken down.

In another embodiment, a response to the signal sent by the first network component is measured on at least one line connecting the first network component and one second network component.

According to the signal a crosstalk may be induced to at least one of the other (adjacent) lines. As the signal is known, this crosstalk can be evaluated in order to determine whether a line between, e.g., a port of the first network component and a particular second network component is interrupted.

In yet another embodiment, a pulse response based on the signal of the predetermined power density is evaluated.

It is a further embodiment that the far-end crosstalk portion and the near-end crosstalk portion are separated from one another.

Hence, determining the far-end crosstalk portion allows to assess whether the line to the particular second network component is valid.

It is a further embodiment that the near-end crosstalk portion and the far-end crosstalk portion are evaluated according to equation $$H_{\mathit{eff},k,l} = H_{\mathit{next},k,l} + \alpha_l \cdot H_{\mathit{fext},k,l} \cdot H_l$$

wherein $H_{\mathit{next},k,l}$ refers to a near-end crosstalk (NEXT) transfer function;

$H_{\mathit{fext},k,l}$ refers to a far-end crosstalk (FEXT) transfer function;

$\alpha_l$ refers to a complex reflection coefficient of the inactive customer-premises equipment (CPE);

$H_l$ refers to a transfer function of a loop l.

The far-end crosstalk function can be assessed according to $$H_{fext,k,l} = \frac{T_{long}(H_{eff,k,l})}{\alpha_l \cdot H_l}.$$

Further, the linear operation $T_{long}(H_{eff,k,l})$ can be described in a time domain, thereby multiplying a time domain impulse response $h_{eff,k,l}$ (i.e., the Fourier transformation of $H_{eff,k,l}$) with a rectangular window function $p_\tau(t)$:

$$(T_{long}(H_{eff,k,l}))(f) \stackrel{def}{=} F_{t \mapsto f}(p_\tau(t) h_{eff,k,l}(t)),$$

wherein $F_{t \mapsto f}$ represents the Fourier transformation (to be processed preferably via an FFT-algorithm);

$p_\tau(t)$ is to be selected such that portions comprising a group delay that is smaller than the group delay of port l are set to 0.

It is also an embodiment that (at least a portion of) alien crosstalk can be determined by averaging a disturbance in a time domain and/or in a frequency domain.

In a next embodiment, the alien crosstalk is evaluated by a method comprising the steps:

a signal-to-noise ratio is correlated across ports that are used for SELT evaluation; and the disturbance is identified in a power density spectrum and/or in timely sequence.

The signal-to-noise ratio (SNR) is processed across several ports of the first network component that may be used for SELT evaluation purposes. The disturbance caused by the alien crosstalk may then be assessed and/or identified within a power density spectrum and/or within a timely sequence.

In another embodiment, at least one of the second network components is running in a low-power mode. Such low-power mode may correspond to a L2-Mode according to an xDSL specification.

It is yet a further embodiment that the first network component is a Central Office (CO) or a Digital Subscriber Line Access Multiplexer (DSLAM).

It is an embodiment that the at least one second network component is a customer-premises equipment (CPE) each.

In yet another embodiment the at least on second network component is off and/or disconnected.

In particular, one of the second network components may be off and/or disconnected. In such case, the connection (line) between the first network component and this second network component may be used for evaluating crosstalk portions (NEXT and FEXT) caused by the signal sent from the first network component (via another line to another second network component).

It is also an embodiment that the far-end crosstalk exceeds a predetermined threshold in order to be evaluated. Otherwise, it may not be regarded as far-end crosstalk.

In a next embodiment, the crosstalk evaluated is used to identify at least one auxiliary path of the MIMO system.

Further, the pulse response evaluated may be used to identify an interruption of a line or connection between the first network component and one second network component.

In an embodiment, the method provided herein may be used in an xDSL environment as well as in an Ethernet environment.

The method may also be used for single ended line testing that is in particular initiated by the first network component.

The problem state supra is also solved by a device for crosstalk evaluation comprising a processor unit that is arranged and/or equipped such that the method as described herein is executable on said processor.

It is an embodiment that said device is a communication device, in particular a Central Office (CO) or a Digital Subscriber Line Access Multiplexer (DSLAM).

The problem is also solve by a communication system comprising said device as describe herein.

Embodiments of the invention are shown and illustrated in the following figures:

BRIEF DESCRIPTION OF THE SEVERAL VIEWS OF THE DRAWING

FIG. 3 shows a flowchart comprising steps of a method to evaluate crosstalk and the perform single ended line testing via such crosstalk interference identified;

FIG. 4 shows a scenario comprising a communication network allowing to send data from a server to a client in particular via an xDSL connection.

DESCRIPTION OF THE INVENTION

Figure 1:
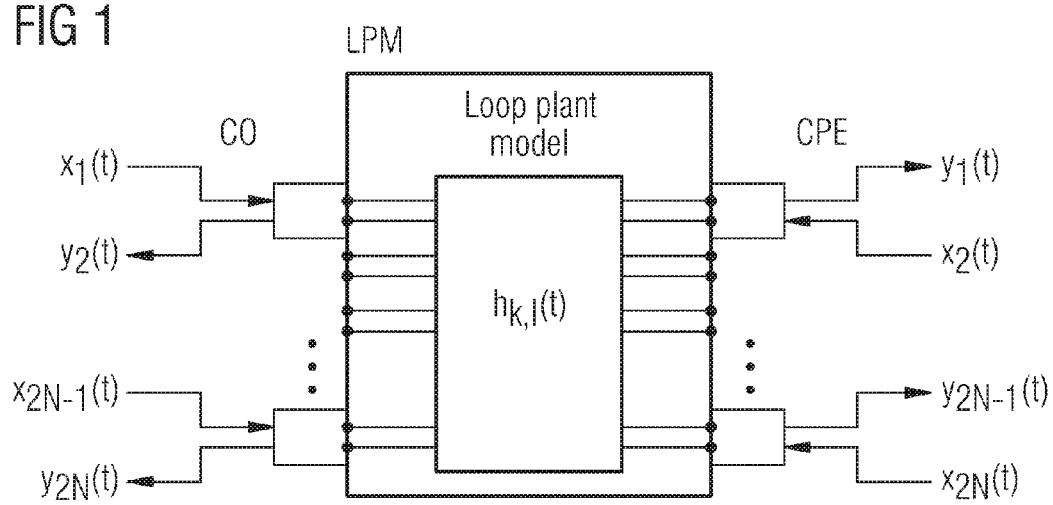
FIG. 1 shows a multiple-input-multiple-output (MIMO) system modeling near end crosstalk (NEXT) and far end crosstalk (FEXT)

FIG. 1 shows a multiple-input-multiple-output (MIMO) system modeling near end crosstalk (NEXT) and far end crosstalk (FEXT). The Loop Plant Model LPM represents the complete channel structure including (but not limited to) a main distribution frame, optional branching devices and crosstalk interferences of various kind.

Advantageously, such Loop Plant Model LPM can be used to model upstream (from a customer-premises equipment CPE to a central office CO) and downstream (traffic from the CO towards the CPE) traffic via separate ports.

Further, the Loop Plant Model LPM comprises a matrix of pulse responses comprising pulse responses of the transmission lines in its diagonal and crosstalk interference outside of the matrix' diagonal:

$$y_k(t) = \sum_{l=0}^{L-1} (h_{k,l} * x_l)(t), \tag{1}$$

wherein $h_{k,k}(t)$ is associated with the respective transmission line and hence represents the pulse response of said transmission line and $h_{k,l}(t)$ ($k \neq l$) represents the crosstalk interference outside of the matrix' diagonal, i.e. crosstalk interference between a port with an index k and another port with an index l.

It is to be noted that the symbol * expresses a convolution operation.

An actual port thus comprises two virtual ports, one port in upstream direction and another port in downstream direction. This allows to capture SELF-NEXT (i.e., a single ended line testing near-end crosstalk between upstream and downstream of the same physical port) in a compact model.

The approach presented herein could be advantageously used as a extension to an SELT measuring principle.

It is noted that such SELT measurement is subject to ITU-T, Study Group 15. The earlier project "G.selt" is migrated into a project "G.lt". Details regarding SELT may be obtained from document NC-U09R1 of ITU Study Group 15.

Hence, not only the main paths of the MIMO system, but also the auxiliary (diagonal) paths are identified. This is advantageously if
  a) at least one customer-premises equipment is switched off or not active; and
  b) the far-end crosstalk portion exceeds a predetermined threshold.

Figure 2:
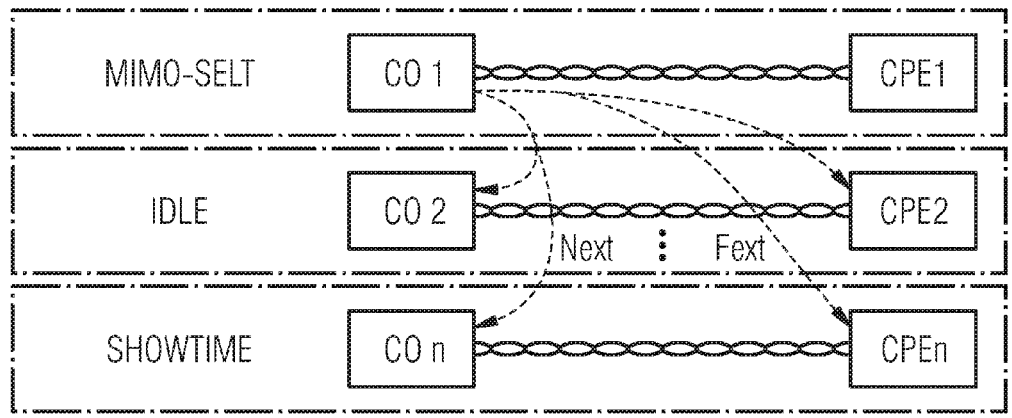
FIG. 2 shows a graph comprising a central office (CO) with several ports (CO1, CO2, . . . , COn) that are connected to a customer-premises equipment (CPE1, CPE2, . . . , CPEn) each.

In FIG. 2, a MIMO-SELT path from a port CO1 of a central office to a customer-premises equipment CPE1, an idle path from a port CO2 of the central office to a customer-premises equipment CPE2 and a SHOWTIME (i.e. "active") path from a port COn of the central office to a customer-premises equipment CPEn are shown.

As the connection between the port CO1 and the customer-premises equipment CPE1 is active, a signal, preferably a pseudo-random signal with a maximum admissible power density is initiated by the central office (via its port CO1). The customer-premises equipment CPE2 is not active, e.g., switched off. The associated port CO2 at the central office is set to a listening state. The path n (also referred to as loop n) between the port COn and the customer-premises equipment CPEn is active, data is exchanged via that loop, both terminals are in a SHOWTIME state. Hence, only limited changes due to the signal initiated via the port CO1 could be determined at the port COn.

Steps for evaluating crosstalk, in particular in order to determine whether or not a loop or path of the MIMO system is interrupted, could be performed either at the central office (in particular within a transceiver chipset of the central office) and/or offline at a network management system.

It is a particular advantage that the method provided fulfills a real-time requirements of the event-synchronization between sending the signal via port CO1 and receiving at port CO2.

A frequency transfer function $H_{\mathit{eff},k,l}$ between a transmitting port k and a receiving (listening) port l can be described as:

$$H_{\mathit{eff},k,l} = H_{\mathit{next},k,l} + \alpha_l \cdot H_{\mathit{fext},k,l} \cdot H_l \quad (2),$$

wherein
  $H_{\mathit{next},k,l}$ refers to a near-end crosstalk (NEXT) transfer function;
  $H_{\mathit{fext},k,l}$ refers to a far-end crosstalk (FEXT) transfer function;
  $\alpha_l$ refers to a complex reflection coefficient of the inactive customer-premises equipment (CPE);
  $H_l$ refers to a transfer function of a loop l.

The complex reflection coefficient $\alpha_l$ as well as the transfer function $H_l$ of loop l can result from a conventional SELT test method.

Subsequently, the near-end crosstalk portion and the far-end crosstalk portion need to be separated from one another.

This can be achieved by utilizing the fact that the near-end crosstalk portion has a reduced runtime due to its limited propagation:

$$H_{\mathit{fext},k,l} = \frac{T_{\mathit{long}}(H_{\mathit{eff},k,l})}{\alpha_l \cdot H_l}, \quad (3)$$

wherein the linear operation $T_{\mathit{long}}(H_{\mathit{eff},k,l})$ can be described in a time domain, thereby multiplying a time domain impulse response $h_{\mathit{eff},k,l}$ (i.e., the Fourier transformation of $H_{\mathit{eff},k,l}$) with a rectangular window function $p_\tau(t)$:

$$(T_{\mathit{long}}(H_{\mathit{eff},k,l}))(f) \stackrel{\mathit{def}}{=} F_{t \mapsto f}(p_\tau(t) h_{\mathit{eff},k,l}(t)), \quad (4)$$

wherein
  $F_t \mapsto_f$ represents the Fourier transformation (to be processed preferably via an FFT-algorithm);
  $p_\tau(t)$ is to be selected such that portions comprising a group delay that is smaller than the group delay of port l are set to 0.

The group delay can be derived from $H_l$ by means of a Fourier transformation.

Regarding the numerical stability of equation (3) it is noted that in particular with regard to long lines or loops a regularization is deemed advantageously. This encounters the fact that an estimation accuracy of $H_{\mathit{fext},k,l}$ will decrease with an increasing frequency.

In addition to a detection of crosstalk based on signals generated inside the MIMO system (also referred to as "alien crosstalk"), it is also possible to identify crosstalk based on disturbances from outside the MIMO system, e.g., a disturbance based on electromagnetic interspersion.

In case of alien crosstalk, an averaging of such disturbance is performed in a time domain and/or in a frequency domain, in particular because of the small pattern of the DMT symbol rates in the time domain and because of the small pattern of the subcarrier spacing in the frequency domain.

Hence, the signal-to-noise ratio is correlated across the ports (available for SELT evaluation), an alien disturbance may be identified in a power density spectrum and/or in timely sequence (switching performance).

It is further possible to perform SELT not only in cases when there is no customer-premises equipment connected (or switched off), but also when it is in a low-power mode (e.g., L2-Mode according to particular xDSL specifications).

The approach presented herein can be applied to various kinds of networks connecting different network components or network elements. The connection can be of xDSL type and/or of non-xDSL type. In can in particular be used for multi-core connections between network components, e.g., in Ethernet environments.

FIG. 3 shows a flowchart comprising steps of a method to evaluate crosstalk and the perform single ended line testing via such crosstalk interference identified.

In a step 301, the first network component sends a signal of a predetermined power density to one second network via a particular line or connection. Preferably, the first network component is a central office comprising several ports to each of which a customer-premises equipment can be connected (according to the graph of FIG. 2).

Pursuant to signal sent in the step 301, the first network component in a step 302 listens to a crosstalk response induced to another line connecting another port of the central office with another customer-premises equipment. Preferably, the customer-premises equipment attached to this line is inactive or in particular switched off.

The far-end crosstalk portion and the near-end crosstalk portion are separated in a step 303. Such processing can be performed, e.g., within the central office or offline within a network management entity.

In a step 304, based on the processed and evaluated crosstalk portions, a connectivity of a further line connecting a further port of the central office with a further customer-premises equipment can be checked.

Hence, according to the steps provided, a single ended line test of adjacent lines can be performed by the central office (or by a digital subscriber line access multiplexer) utilizing crosstalk interference to such adjacent lines.

A particular scenario of a communication network is shown in FIG. 4. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2+;
High Data Rate Digital Subscriber Line HDSL;
Very High Speed Digital Subscriber Line VDSL, VDSL2.

The customer can be connected to the Customer-Premises Equipment CPE via a set-top box and a television or via a personal computer PC/TV. Data that is sent from the PC/TV towards the Server is referred to as Upstream Traffic.

Preferably, an operator or provider wants to efficiently use the xDSL downstream direction from the CO/DSLAM to the CPE by employing high data rate with low crosstalk effects.

The invention claimed is:

1. A method for crosstalk evaluation of a channel, the channel being represented by a multiple-input-multiple-output (MIMO) system connecting a first network component with at least one second network component, the MIMO system including first coefficients associated with transmission lines and second coefficients associated with crosstalk, wherein the crosstalk contains a far-end crosstalk portion and a near-end crosstalk portion, the method comprises the steps of:

sending, via the first network component, a signal of a predetermined power density to one of second network components; and
evaluating the far-end crosstalk portion and the near end crosstalk portion according to equation:

$$H_{\mathit{eff},k,l} = H_{\mathit{next},k,l} + \alpha_l \cdot H_{\mathit{fext},k,l} \cdot H_l$$

with $$H_{\mathit{fext},k,l} = \frac{T_{\mathit{long}}(H_{\mathit{eff},k,l})}{\alpha_l \cdot H_l}$$

wherein:
$H_{\mathit{fext},k,l}$ is a far-end crosstalk portion,
$H_{\mathit{next},k,l}$ is a near-end crosstalk portion
$H_{\mathit{eff},k,l}$ is a transfer function between a transmitting port k and a receiving port l,
$H_l$ is a transfer function of a loop l,
$\alpha_l$ is a complex reflection coefficient, and
$T_{\mathit{long}}$ is a linear operation utilizing a fact that the near-end crosstalk portion has a reduced runtime due to its limited propagation.

2. The method according to claim 1, which further comprises measuring a response to the signal sent by the first network component on at least one line connecting the first network component and the one second network component.

3. The method according to claim 1, which further comprises evaluating a pulse response based on the signal.

4. The method according to claim 1, which further comprises separating the far-end crosstalk portion and the near-end crosstalk portion.

5. The method according to claim 1, wherein a linear operation:

$$H_{\mathit{fext},k,l} = \frac{T_{\mathit{long}}(H_{\mathit{eff},k,l})}{\alpha_l \cdot H_l}$$

can be referred to as:

$$(T_{\mathit{long}}(H_{\mathit{eff},k,l}))(f) \stackrel{\mathit{def}}{=} F_{t \mapsto f}(p_T(t) h_{\mathit{eff},k,l}(t))$$

wherein $p_T(t)$ is a rectangular window function $p_T(t)$, and $h_{\mathit{eff},k,l}$ is a time domain impulse response.

6. The method according to claim 1, which further comprises determining alien crosstalk by averaging a disturbance in at least one of a time domain and a frequency domain.

7. The method according to claim 6, which further comprises the steps of:

correlating a signal-to-noise ratio across ports that are used for single ended line testing (SELT) evaluation; and
identifying a disturbance in at least one of a power density spectrum and a timely sequence.

8. The method according to claim 1, wherein at least one second network component is running in a low-power mode.

9. The method according to claim 8, wherein the low-power mode corresponds to an L2-Mode according to an xDSL specification.

10. The method according to claim 1, wherein the first network component is one of a Central Office and a Digital Subscriber Line Access Multiplexer.

11. The method according to claim 1, wherein the at least one second network component is customer-premises equipment.

12. The method according to claim 1, wherein at least one of the second network components is at least one of off and disconnected.

13. The method according to claim 1, wherein the far-end crosstalk exceeds a predetermined threshold.

14. The method according to claim 1, wherein the crosstalk evaluated is used to identify at least one auxiliary path of the MIMO system.

15. The method according to claim 1, which further comprises using an evaluated pulse response to identify an interruption of a line.

16. The method according to claim 1, which further comprises performing the method in at least one of an xDSL environment and an Ethernet environment.

17. The method according to claim 1, which further comprises performing the method for single ended line testing initiated by the first network component.

18. A device for crosstalk evaluation, comprising:
a processor unit programmed to:
send, via a first network component, a signal of a predetermined power density to one of second network components; and
evaluate a far-end crosstalk portion and a near end crosstalk portion according to equation:

$$H_{\mathit{eff},k,l} = H_{next,k,l} + \alpha_l \cdot H_{\mathit{fext},k,l} \cdot H_l$$

with $$H_{\mathit{fext},k,l} = T_{long}(H_{\mathit{eff},k,l})/\alpha_l \cdot H_l$$

wherein:

$H_{\mathit{fext},k,l}$ is a far-end crosstalk portion,
$H_{next,k,l}$ is a near-end crosstalk portion
$H_{\mathit{eff},k,l}$ is a transfer function between a transmitting port k and a receiving port l,
$H_l$ is a transfer function of a loop l,
$\alpha_l$ is a complex reflection coefficient and
$T_{long}$ is a linear operation utilizing a fact that the near-end crosstalk portion has a reduced runtime due to its limited propagation.

19. The device according to claim 18, wherein the device is a communication device.

20. The device according to claim 18, wherein the device is a communication device selected from the group consisting of a Central Office and a Digital Subscriber Line Access Multiplexer.

21. A communication system, comprising:
   a device for crosstalk evaluation having a processor unit programmed to:
   send, via a first network component, a signal of a predetermined power density to one of second network components; and
   evaluate a far-end crosstalk portion and a near end crosstalk portion according to equation:

$$H_{\mathit{eff},k,l} = H_{next,k,l} + \alpha_l \cdot H_{\mathit{fext},k,l} \cdot H_l$$

with $$H_{\mathit{fext},k,l} = T_{long}(H_{\mathit{eff},k,k})/\alpha_l \cdot H_l$$

wherein:

$H_{\mathit{fext},k,l}$ is a far-end crosstalk portion,
$H_{next,k,l}$ is a near-end crosstalk portion
$H_{\mathit{eff},k,l}$ is a transfer function between a transmitting port k and a receiving port l,
$H_l$ is a transfer function of a loop l,
$\alpha_l$ is a complex reflection coefficient, and
$T_{long}$ is a linear operation utilizing a fact that the near-end crosstalk portion has a reduced runtime due to its limited propagation.

\* \* \* \* \*